United States Patent Office 3,480,069
Patented Nov. 25, 1969

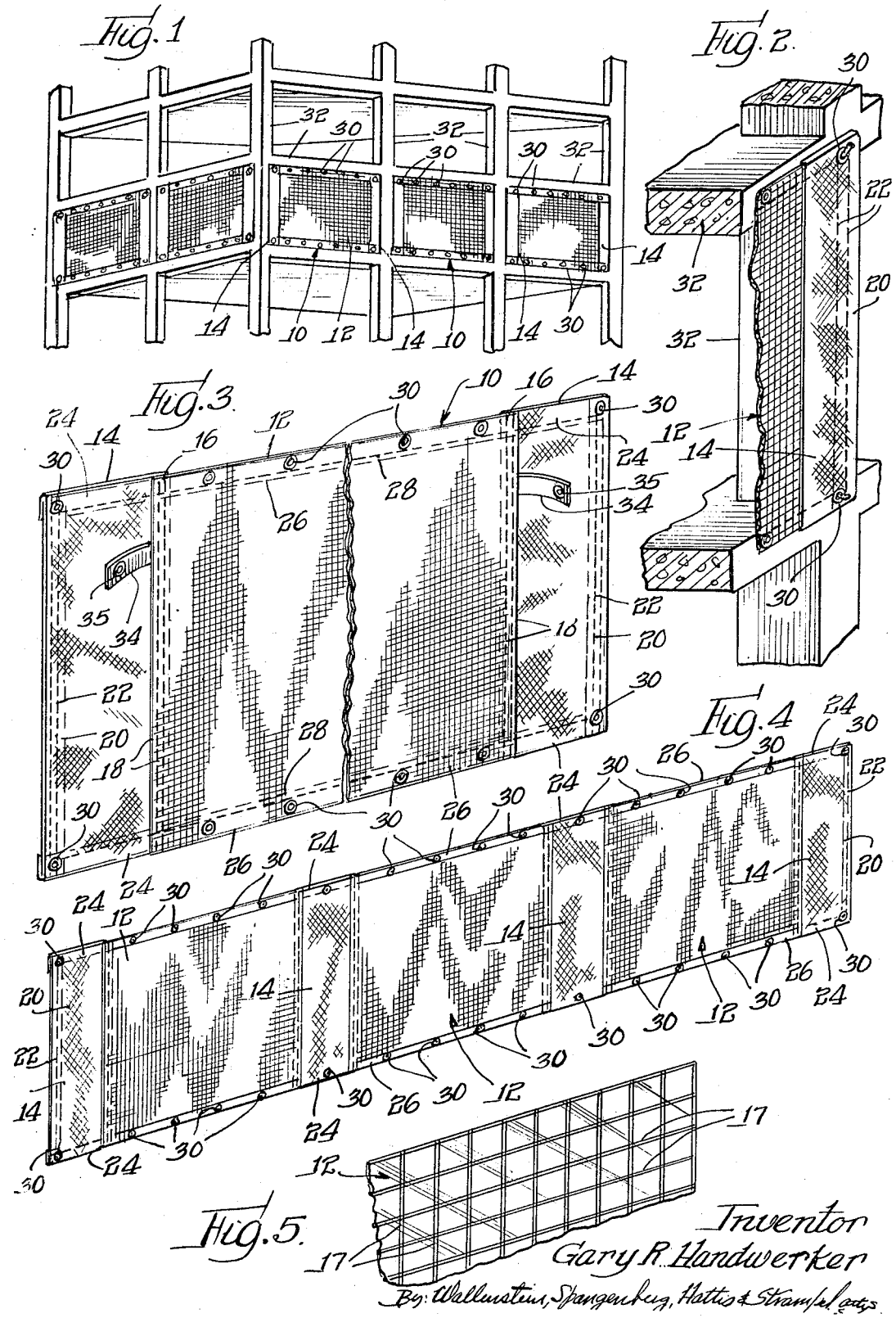

3,480,069
TEMPORARY WALL CONSTRUCTION
Gary R. Handwerker, Morton Grove, Ill., assignor to Midwest Canvas Corporation, Chicago, Ill., a corporation of Illinois
Filed May 6, 1968, Ser. No. 726,868
Int. Cl. A47h 23/10; E06b 9/00
U.S. Cl. 160—354                              5 Claims

ABSTRACT OF THE DISCLOSURE

An article for use in forming a temporary wall between structural members to protect workmen, construction materials, equipment, and the like, against the elements. The article comprises a relatively wide, flexible light-transmitting panel fabricated of plastic, and two narrow panels, advantageously fabricated of fire- and moisture-proof canvas, joined to opposite side margins of the light-transmitting panel. Means are provided in the panels to enable the article to be suspended in a substantially vertical plane from structural members to form a temporary, protective wall therebetween. Said means also can be employed to interconnect a plurality of the articles to form a temporary wall of any desired dimensions. Tab means are provided inwardly of the side margins to enable the central portion of the article to be supported in a manner whereby it will not sag, and to prevent flapping caused by the wind.

---

It is common practice, especially during periods of cold or inclement weather, for workmen in the building trades to install temporary shields about an area in which they are working to protect themselves, construction materials and/or equipment against the elements. Heretofore, large sheets of canvas or plastic were used for this purpose. Canvas sheets have the disadvantage of being opaque, thereby substantially preventing natural light from entering the area protected by the canvas sheets and, in many instances, requiring the use of artificial light to enable work being done in the area to safely proceed. Plastic sheets, while being transparent or translucent, are inflammable, and thus constitute a constant hazard to workmen, equipment and construction materials. A further disadvantage common to both the canvas and plastic sheets is that they lack means for suspending them from structural members. As a result, they are simply drooped over and about structural members, generally in a haphazard manner, thereby increasing the possibility of damage to the sheets from sharp objects, sparks, discarded cigarette and cigar butts, contact with building materials, and the like.

In accordance with the present invention, there is provided an article, for use in forming a temporary wall construction between structural members, which effectively overcomes the aforementioned disadvantages of canvas sheets and plastic sheets heretofore employed for this purpose. The article of this invention, while being light transmitting, substantially reduces the hazard from fire. In addition, the article, or two or more of them, can be suspended between structural members in a manner to provide excellent light transmission and protection against the elements, and minimum exposure to damage of the temporary wall formed thereby.

The article of this invention comprises a wide, light-transmitting panel formed of flexible plastic sheet material. Joined to the light-transmitting panel, along two of its opposite margins, are relaitvely narrow panels advantageously fabricated of fireproof and moisture-repellent canvas. The narrow panels serve, among other things, as fire barriers in the event that the wide, plastic light-transmitting panel should accidentally be set on fire. The extent of any such fire will thus be confined to a limited area, and can be more easily brought under control than is the case with plastic sheet materials heretofore used for temporary wall construction. In the preferred embodiment of the invention, the narrow, fireproof panels of the article, as well as the wide, plastic light-transmitting panel, are provided with grommet reinforced openings therethrough to enable the article to be suspended in a substantially vertical plane between structural members to form a temporary wall therebetween. The openings also can be used to interconnect two, or more, of the articles to form a temporary wall construction of any desired dimensions. Tab means are provided inwardly of the side margins of the article to enable the central portion thereof to be supported in a manner to prevent sagging, and to prevent flapping caused by the wind.

Other advantages and features of the present invention will become clear upon making reference to the specification to follow, the claims and the drawings wherein:

FIG. 1 is a fragmentary view in perspective showing an embodiment of the article of this invention employed as a temporary wall construction between structural members at one level of the structural framework of a building;

FIG. 2 is an enlarged fragmentary view in perspective showing one means for suspending said embodiment on the structural members of the building illustrated in FIG. 1;

FIG. 3 is a fragmentary view in perspective of said embodiment of the article;

FIG. 4 is a view in perspective showing a plurality of the articles interconnected to form a temporary wall construction of desired dimensions; and FIG. 5 is an enlarged fragmentary view in perspective showing a portion of the light-transmitting panel of said embodiment of the article.

Referring, now, in greater detail to the drawings which illustrate a preferred embodiment of the invention, the article 10, as shown in FIG. 3, comprises a wide, light-transmitting panel 12 having a pair of relatively narrow, opaque, fireproof panels 14—14 joined thereto along two of its opposite side margins 16—16. The light-transmitting panel 12 advantageously is fabricated of translucent or clear, flexible plastic sheet material such as polyethylene, polypropylene, polyvinyl acetate, a polyester, or the like. As shown in FIG. 5, the plastic sheet material employed in forming the panel 12 desirably is reinforced with loosely interwoven threads 17 made of nylon, fiberglass, or the like, to impart added strength characteristics to the panel and to render it more resistant to tearing or cutting. The fireproof panels 14—14 desirably are fabricated of a heavy, closely woven fabric such as canvas. The fabric can be rendered fireproof in accordance with conventional practices, and may advantageously be further treated to impart moisture-repellent properties to it.

The fireproof panels 14—14, as illustrated, are joined to the margins 16—16 of the light-transmitting panel 12 by stitching 18. The free side margins 20—20 of the fireproof panels 14—14 desirably are folded over and joined to the main body portion thereof as by stitching 22. The top and bottom margins 24—24 of the fireproof panels 14—14, and the top and bottom margins 26—26 of the light-transmitting panel 12 desirably are folded over twice and joined to their respective main body portions as by stitching 28. This construction imparts added strength to the article and enables it to better resist tearing and any undue stresses placed on it while in use.

In the preferred embodiment of the invention illustrated, the folded top and bottom margins 24—24 of the fireproof panels 14—14, and the folded top and bottom margins 26—26 of the light-transmitting panels 12, advantageously are provided with grommets 30 to enable the article 10 to be suspended between structural members 32—32, as shown in FIGS. 1 and 2, or to enable two or more of the articles to be interconnected, as shown in FIG. 4. The grommets 30 are adapted to receive hooks, nails, rope, or the like, which can be attached to structural members for supporting the article, or a number thereof, in a substantially vertical plane. Additional means such as tabs 34—34, having grommets 35—35, advantageously are provided to enable the central portion of the article to be better supported to prevent sagging, and more importantly, to prevent the area between the ends of the article from flapping due to wind, thus eliminating possible damage to the light-transmitting panel 12. Equivalents of the grommets, such as hooks, eyelets, or the like, can, of course, be employed for like purposes.

In utilizing the article 10, suitable support means, anchored to spaced structural members, are inserted through the grommets provided in the article. As indicated, nails, hooks, rope, or the like, can be used for this purpose. It is desirable that all four sides of the article be secured to structural members to provide maximum protection against the elements and to avoid damage to the article.

Temporary walls of any desired size can be made with the articles simply by securing several of them together with cord, for example, and then suspending them from support means anchored in structural members. The rugged construction of the article enables it to withstand rough treatment. It can be folded into a compact package for easy handling and transport between construction sites, or for storage.

What is claimed is:

1. An article for use in forming a temporary wall between structural members to protect workmen, construction materials, equipment, and the like, against the elements, comprising a substantially air- and moisture-impervious light-transmitting panel of flexible plastic sheet material, said light-transmitting panel being joined along two of its opposite side margins to panels of a substantially fireproof sheet material, said panels of fireproof sheet material being narrower than said light-transmitting panel and having means thereon for enabling the article to be suspended between structural members to form a temporary wall therebetween.

2. An article in accordance with claim 1 wherein the substantially air- and moisture-impervious light-transmitting panel is reinforced to enable it to withstand stresses placed thereon, and is provided with means which cooperate with said means of the fireproof panels to facilitate suspension of the article between structural members.

3. An article in accordance with claim 1 wherein the fireproof panels are formed of fireproof and moisture resistant canvas, and are provided with a plurality of reinforced peripheral openings therethrough for receiving an anchored support element for suspending the article in an essentially vertical plane.

4. An article in accordance with claim 1 wherein the fireproof panels are provided with tab means for enabling the central portion of the article to be supported against sagging and to prevent any substantial areas of the article from flapping due to wind.

5. A temporary wall construction adapted to be suspended between structural members thereby to provide protection against the elements in an area defined by the structural members, comprising a plurality of releasably interconnected articles suspended in an essentially vertical plane from structural members, each of said articles comprising a wide, air- and moisture-impervious light-transmitting panel of flexible plastic sheet material, said light-transmitting panel being joined along two of its opposite side margins to relatively narrow panels of substantially fireproof sheet material, and means on said light-transmitting panels and said fireproof panels for enabling said articles to be releasably interconnected to form an essentially continuous lightweight, temporary wall construction capable of being suspended between and around structural members.

References Cited

UNITED STATES PATENTS

| | | | |
|---|---|---|---|
| 1,203,587 | 11/1916 | Cring | 160—327 X |
| 1,589,163 | 6/1926 | Hinkle | 160—390 X |
| 2,780,571 | 2/1957 | Downing et al. | 161—403 |
| 2,848,233 | 8/1958 | Wynn | 135—5 |
| 2,937,700 | 5/1960 | Gibbons | 160—237 X |
| 3,321,003 | 5/1967 | Boerner | 160—237 |
| 3,330,330 | 7/1967 | Sanderson | 160—327 |

PETER M. CAUN, Primary Examiner

U.S. Cl. X.R.

160—237, 368